United States Patent Office 3,375,603
Patented Apr. 2, 1968

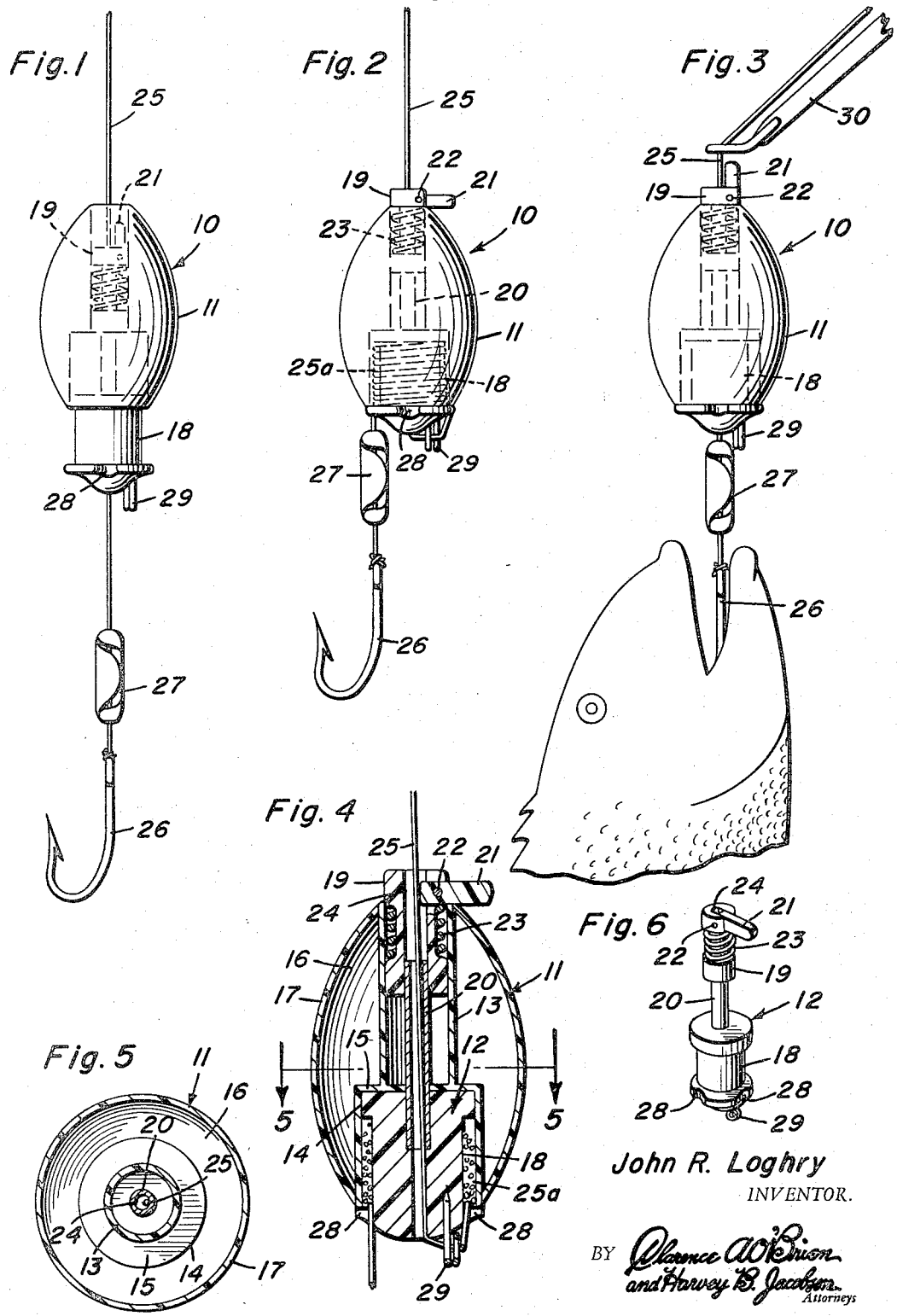

3,375,603
SLIP FLOAT WITH LINE LOCKING MEANS
John R. Loghry, Tucson, Ariz., assignor of fifty percent to Herbert A. Loghry, Yuma, Ariz.
Filed Apr. 21, 1966, Ser. No. 544,221
10 Claims. (Cl. 43—43.11)

This invention relates to new and useful improvements in fishing floats, and the principal object of the invention is to facilitate casting with any desired length of line between the float and the hook, so as to permit fishing at any desired depth after the cast is made.

This object is attained by the provision of a float with a slidable tubular member having a passage therethrough for the line, a portion of the tubular member providing a spool around which a desired length of line may be wound. The spool is retractable into the body of the float to retain the line on the spool while casting, but when the float falls in water, the spool is automatically projected from the float body and the selected length of line is unwound from the spool to facilitate fishing at a selected depth.

One important feature of the invention resides in the provision of novel means for releasably locking the slidable tubular member in a position wherein the spool is retracted in the float body, thus preventing undesired unwinding of the line from the spool prior to casting, as for example, while the fisherman walks from one place to another. By the same token, with the spool locked in its retracted position, the float may be used in the conventional manner without sliding of the line through the float.

Another important feature of the invention involves the provision of a novel spring clasp for frictionally but releasably securing the line to the spool at a point corresponding to the desired length of line between the float and the hook. The arrangement is such that when a fish is hooked, the line is automatically disengaged from the spring clasp to permit the line to be reeled in and the float and hook brought to the tip of the casting rod, so that the fish may be easily and conveniently landed.

Another important feature of the invention resides in a novel construction of the float and cooperating tubular member, the latter being longitudinally adjustable so as to facilitate proper cooperation of the aforementioned spool locking means with the float body.

The device of the invention is simple in construction, efficient in operation, and lends itself to convenient and economical manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the invention, showing the spool projected from the float body;

FIGURE 2 is a side elevational view thereof, showing the spool retracted in the float body;

FIGURE 3 is a side elevational view illustrating the operation of the device when a fish is hooked and also showing the relationship of the device to a casting rod;

FIGURE 4 is an enlarged, vertical sectional view of the float;

FIGURE 5 is a cross-sectional view, taken substantially in the plane of the line 5—5 in FIGURE 4; and FIGURE 6 is a perspective view of the tubular member with its spool and locking means.

Referring now to the accompanying drawings in detail, the slip float of the invention is designated generally by the reference character 10 and consists of two main components, namely, a float body 11 and a slidable tubular member 12.

The body 11 is provided with a vertical bore 13, the lower end portion of which is enlarged to form a counterbore 14, an annular step or shoulder 15 existing at the junction of the bore with the counterbore, as will be clearly apparent. As a practical matter, the float body 11 may be formed from suitable lightweight material such as cork, or the like, although in the preferred arrangement as shown in the drawings, the float body is fabricated from plastic and is hollow as indicated at 16 to attain the desired buoyancy. In such a construction the bore 13 and counterbore 14 are defined by lengths of tubing mounted within a hollow shell 17 at opposite sides of a disk-like element which provides the aforementioned step or shoulder 15. It will be understood, of course, that the bore 13 and the counterbore 14 are open, respectively, at the upper and lower ends of the body of the float.

The aforementioned tubular member 12 consists of three main components, namely, a lower portion in the form of a spool 18, an upper sleeve 19, and a tube 20 which connects the spool to the sleeve. The tube 20 is screw-threaded, at either or both ends, into the spool and the sleeve, so that by relative rotation of the screw-threaded parts, the over-all length of the tubular member 12 may be increased or decreased for a purpose hereinafter to be described.

The tubular member 12 is slidably positioned in the float body 11 with the spool 18 thereof being slidably received in the counterbore 14, the sleeve 19 thereof slidably disposed in the bore 13, and the tube 20 thereof passing slidably through an aperture in the aforementioned disk-shaped element 15, as will be clearly apparent from FIGURE 4. When the member 12 is slid upwardly so that the spool 18 is fully retracted in the counterbore 14 as shown in FIGURES 2 and 4, the abutment shoulder or element 15 will engage the spool and thus prevent further upward sliding of the member 12 in the float body. It will be observed that in this position the upper end portion of the sleeve 19 projects somewhat from the bore 13 above the top of the float body, the extent of this projection being variable by the aforementioned screw-threaded adjustment of the tube 20. On the other hand, when the member 12 is slid downwardly in the float body, the spool 18 will be projected from the lower end of the body 11 as shown in FIGURE 1 and further downward sliding of the member 12 will be prevented by abutment of the sleeve 19 with the element 15.

Novel means are provided for releasably locking the member 12 in its upwardly slid position wherein the spool 18 is retracted in the counterbore 14, these means comprising a laterally projectable and retractable detent 21 which is pivotally mounted in a recess at one side of the upper end portion of the sleeve 19 by a horizontal pivot pin 22. When the member 12 is in its upwardly slid position, the detent 21 may be swung outwardly to a horizontal position as shown in FIGURES 2 and 4, wherein the detent engages the upper end of the float body 11 and, by preventing downward sliding of the member 12, locks the spool 18 in its retracted position in the counterbore 14. However, when the detent 21 is swung upwardly to a vertical position as shown in FIGURE 1, downward sliding of the sleeve 19 in the bore 13 is facilitated to permit downward projection of the spool 18 from the float body. The intermediate portion of the sleeve 19 is grooved or otherwise cross-sectionally reduced to accommodate a coil spring 23, the upper end of which bears against the detent 21 at a point substantially below the pivot pin 22, the spring serving to releasably retain the detent 21 either in its projected or in its retracted position. It is to be understood that the function of the spring 23 is merely as aforesaid, and that the detent 21 is moved from either of its positions to the other by hand.

The tubular member 12 affords a vertical passage 24 therethrough, such passage extending throughout the sleeve 19, tube 20 and spool 18 so that a line 25 may extend freely slidably through the passage. The end of the line below the float is equipped with the usual hook 26 and sinker 27.

A selected length of the line between the float and the hook is adapted to be wound around the spool 18 as indicated at 25a in FIGURES 2 and 4, and the lower flange of the spool is provided with a plurality of notches 28 to permit extension of the line to and from the spool when the latter is retracted into the float body. A spring clasp 29 is mounted at the lower end of the spool 18 at one side of the line passage 24. The clasp 29 is adapted to frictionally grip the line 25 at a selected point, the clasp preferably consisting of a wire coil of approximately two turns, with pointed end portions embedded in the spool, as will be apparent from FIGURE 4. In engaging the line 25 with the clasp 29, the line is simply pressed between the turns of the coil so that it is frictionally, but releasably held therebetween.

The operation of the device is as follows:

With the detent 21 retracted, the tubular member 12 may be slid downwardly in the float body 11 so as to project the spool 18 as shown in FIGURE 1, and the line 25 may be slid freely through the passage 24 in the member 12 until a selected length of line exists between the float and the hook 26 in accordance with a selected depth at which the fisherman desires to fish. A portion of the line immediately adjacent the lower end of the spool 18 is then engaged with the spring clasp 29 so as to prevent further sliding of the line through the float. The selected length of the line between the float and the hook may then be wound around the spool 18 as at 25a and the member 12 slid upwardly in the float body so as to retract the spool 18 into the counterbore 14. The detent 21 is then swung outwardly to its locking position, whereby to prevent projection of the spool 18 from the counterbore 14 while the fisherman baits his hook or moves from one place to another.

When the fisherman is ready to cast, the detent 21 is retracted and while the cast is being made, the spool 18 with the line wound around the same remains in its retracted position until the float hits water. While the body 11 floats on the surface of the water, the weight of the member 12 and of the sinker 27 will cause the member 12 to slide downwardly in the float body, thus projecting the spool 18 and permitting the line to unwind from the spool for fishing at the preselected depth.

When a fish is caught on the hook as shown in FIGURE 3, the pull of the fish on the line will automatically disengage the line from the spring clasp 29, thus permitting the fisherman to reel in the line freely through the float until the sinker 27 comes in contact with the float and both the float and the sinker are brought to the tip of the casting rod 30 to facilitate convenient removal of the fish from the hook without tangling of the line.

It will be appreciated that the float of the invention may also be used in a conventional manner without preloading the spool 18 with a portion of the line. Under such conditions the line is simply engaged at a selected point along its length with the spring clasp 29 in order to prevent sliding of the line through the float, and sliding of the member 12 in the float body is prevented by placing the detent 21 in its locked position with the spool 18 retracted into the counterbore 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination of a fishing line equipped with a sinker, and a slip float comprising a buoyant body provided with a vertical bore, a tubular member slidable in said bore and having a vertical line passage therethrough, the lower end portion of said tubular member constituting a line winding spool projectable downwardly from and retractable upwardly into said body upon sliding of the tubular member respectively downwardly and upwardly relative to the body, said line extending slidably through said passage and a portion of the line between the lower end of the passage and said sinker being wound around said spool when the latter is retracted into said body, and a laterally projectable and retractable detent provided at the upper end of said tubular member, said detent in its projected position engaging the upper end of said body whereby to sustain said spool in its retracted position, the detent in its retracted position being receivable in the bore of said body to permit downward projection of the spool and unwinding of the line therefrom.

2. The device as defined in claim 1 together with resilient means carried by said tubular member and engaging said detent to retain the same selectively in its projected and retracted positions.

3. The device as defined in claim 1 together with a spring clasp provided at the lower end of said spool and frictionally engaging said line at a point between the lower end of said passage and the spool, whereby to prevent sliding of the line through the float until the line is disengaged from said clasp.

4. The device as defined in claim 1 together with means for varying the length of said tubular member whereby to adjust the position of said detent relative to the upper end of said body.

5. The device as defined in claim 1 wherein the lower end portion of said bore in said body is provided with a counterbore receiving said spool therein, said body providing an abutment shoulder at the junction of said counterbore with the upper portion of the bore whereby to limit upward sliding of said tubular member in said body, together with means for varying the length of the tubular member to adjust the position of said detent relative to the upper end of the body when said spool is retracted into the counterbore into abutment with said shoulder.

6. A slip float comprising a buoyant body provided with a vertical bore, a tubular member slidable within limits in said bore and having a vertical passage for slidable reception of a fishing line, the lower end portion of said tubular member constituting a spool around which a portion of the stated line may be wound, said spool being projectable downwardly from and retractable upwardly into said body upon sliding of the tubular member respectively downwardly and upwardly relative to the body, and a laterally projectable and retractable detent provided at the upper end of said tubular member, said detent in its projected position engaging the upper end of said body whereby to sustain said spool in its retracted position, the detent in its retracted position being receivable in the bore of said body to permit downward projection of the spool and unwinding of a line therefrom.

7. The device as defined in claim 6 together with resilient means carried by said tubular member and engaging said detent to retain the same selectively in its projected and retracted positions.

8. The device as defined in claim 6 together with means for varying the length of said tubular member whereby to adjust the position of said detent relative to the upper end of said body.

9. The device as defined in claim 6 wherein the lower end portion of said bore is provided with a counterbore receiving said spool therein, said body providing an abutment shoulder at the junction of said counterbore with the upper portion of the bore whereby to limit upward sliding of said tubular member in said body, together with means for varying the length of said tubular member to adjust the position of said detent relative to the upper end of the body when said spool is retracted into the counterbore into abutment with said shoulder.

10. The device as defined in claim 6 together with a spring clasp provided at the lower end of said spool and adapted to frictionally but releasably engage the stated line, whereby to prevent sliding of the line through the float.

References Cited

UNITED STATES PATENTS

| 2,607,154 | 8/1952 | Martens | 43—43.11 |
| 2,694,878 | 11/1954 | Martens | 43—43.11 |
| 2,888,771 | 6/1959 | Stephens et al. | 43—43.11 X |

SAMUEL KOREN, *Primary Examiner.*

J. H. CZERWONKY, *Assistant Examiner.*